(12) United States Patent
Kim

(10) Patent No.: US 10,641,501 B2
(45) Date of Patent: May 5, 2020

(54) SMOKE EXHAUST HOOD APPARATUS HAVING HEATER FOR COOKING FOOD

(71) Applicant: Nam Hoon Kim, Seoul (KR)

(72) Inventor: Nam Hoon Kim, Seoul (KR)

(73) Assignee: Nam Hoon Kim, Seoul (KR)

( * ) Notice: Subject to any disclaimer, the term of this patent is extended or adjusted under 35 U.S.C. 154(b) by 222 days.

(21) Appl. No.: 15/777,675

(22) PCT Filed: Nov. 29, 2016

(86) PCT No.: PCT/KR2016/013879
§ 371 (c)(1),
(2) Date: May 21, 2018

(87) PCT Pub. No.: WO2017/095109
PCT Pub. Date: Jun. 8, 2017

(65) Prior Publication Data
US 2018/0347827 A1 Dec. 6, 2018

(30) Foreign Application Priority Data

Nov. 30, 2015 (KR) .................. 10-2015-0168271

(51) Int. Cl.
F24C 15/20 (2006.01)
A47J 37/06 (2006.01)
F24F 7/06 (2006.01)
F24F 13/02 (2006.01)
A47J 36/38 (2006.01)
F24F 11/00 (2018.01)

(52) U.S. Cl.
CPC .......... *F24C 15/2042* (2013.01); *A47J 36/38* (2013.01); *A47J 37/06* (2013.01); *F24C 15/2085* (2013.01); *F24F 7/06* (2013.01); *F24F 13/02* (2013.01); *F24F 11/0001* (2013.01)

(58) Field of Classification Search
CPC .............................. F24C 15/2042; A47J 36/38
See application file for complete search history.

(56) References Cited

FOREIGN PATENT DOCUMENTS

| JP | 2004-190899 A | 7/2004 |
| KR | 20-2000-0015578 A | 8/2000 |
| KR | 10-2006-0030092 A | 4/2006 |
| KR | 20-0416595 B1 | 5/2006 |

(Continued)

OTHER PUBLICATIONS

English Translation KR1020060030092 (Year: 2006).*

(Continued)

*Primary Examiner* — Jason L Vaughan
*Assistant Examiner* — Amanda Kreiling

(57) ABSTRACT

A smoke exhaust hood apparatus having a heater for cooking food according to the present invention comprises: a suction part for suctioning smoke generated at a cooking part; an exhaust pipe through which the smoke suctioned by the suction part is transferred; and a heater assembly disposed at one side of the outside of one of the exhaust pipe and the suction part, the heater assembly radiating heat from above the cooking part. The apparatus has a heater installed at a lower portion adjacent to the suction part of the smoke exhaust hood apparatus installed above a food, so as to heat the food from above, and thus can assist food cooking or can quickly cook a tasty food.

7 Claims, 5 Drawing Sheets

(56) References Cited

FOREIGN PATENT DOCUMENTS

| KR | 10-2008-0076172 A | 8/2008 |
| KR | 10-2012-0030118 A | 3/2012 |
| KR | 10-2015-0021214 A | 3/2015 |

OTHER PUBLICATIONS

KR1020060030092 Drawings (Year: 2006).*
International Search Report for PCT/KR2016/013879 dated Mar. 28, 2017.

* cited by examiner

SMOKE EXHAUST HOOD APPARATUS HAVING HEATER FOR COOKING FOOD

CROSS REFERENCE TO RELATED APPLICATIONS

This application claims priority to Korean Patent Application No. 10-2015-0168271, filed on Nov. 30, 2015. Further, the application is the National Phase application of International Application No. PCT/KR2016/013879, filed on Nov. 29, 2016, which designates the United States. Each of these applications is hereby incorporated by reference in their entirety into the present application.

FIELD

The present invention relates to a smoke exhaust hood apparatus having a heater for cooking food, and more particularly to a smoke exhaust hood apparatus that is installed above a cooking table in order to suction smoke generated at the time of cooking food in an indoor space, such as a house or a restaurant, wherein the smoke exhaust hood apparatus is provided with a heater assembly including a heater for cooking food, the heater assembly being configured to be turnable, whereby the heater assembly uniformly supplies heat to the food alone or together with a heat source provided at a conventional table in order to rapidly cook the food, which improves use convenience.

BACKGROUND

A smoke exhaust hood apparatus for cooking food is also called an exhaust duct or an exhaust hood. The smoke exhaust hood apparatus for cooking food includes a suction part for suctioning smoke or toxic gas generated when fish or meat is broiled on a hot plate or a grill located on a heat source, such as a portable gas range, a charcoal fire for restaurants, or an electric heater, an exhaust pipe along which the smoke suctioned through the suction part moves, and an exhaust chamber having mounted therein a blower for discharging the suctioned smoke to the outside. In addition, the smoke exhaust hood apparatus for cooking food may further include a motor for moving the suction part and the exhaust pipe upwards and downwards according to a user's switching manipulation.

In the smoke exhaust hood apparatus for cooking food, food is placed on the hot plate or the grill, the suction part is moved downwards manually or according to the switching manipulation such that the suction part approaches the hot plate, a smoke or smell generated at the time of cooking the food is suctioned through the suction part, and the suctioned smoke is discharged to the outside through the exhaust pipe. After cooking is finished, the suction part and the exhaust pipe are moved upwards toward the ceiling, either manually or according to the switch manipulation.

In the case in which the smoke exhaust hood apparatus is used, the following problems may occur. The lower part of meat or fish is heated first by the heat source at the time of cooking the meat or the fish, with the result that oil is generated from the meat or the fish. At this time, the oil may explosively move out of the meat or the fish. Furthermore, the lower surface of the food is not visible. As a result, it is difficult to check the cooked state of the food, whereby the food may be excessively cooked or may even be burnt.

Therefore, there is a necessity for a structure connected to the smoke exhaust hood apparatus in order to solve problems with a cooking system that uses only a lower heat source, as described above, whereby it is possible to improve use convenience.

Related Art Documents (Patent Document 1) Korean Patent Application Publication No. 2015-0021214
(Patent Document 2) Korean Patent Application Publication No. 2012-0030118

Technical Problems

Therefore, the present invention has been made in view of the above problems, and it is an object of the present invention to provide a smoke exhaust hood apparatus having a heater for cooking food configured such that a heater is mounted in the vicinity of the outside of an exhaust hood in order to discharge smoke through the exhaust hood and to apply heat to food from above the food, whereby it is possible to rapidly cook more delicious food.

It is another object of the present invention to provide a smoke exhaust hood apparatus having a heater for cooking food configured such that a turnable heater assembly is provided, whereby it is possible to secure space on a cooking table and to improve convenience of use.

It is another object of the present invention to provide a smoke exhaust hood apparatus having a heater for cooking food configured such that a heater is configured to have a multi-layered structure, in which a plate having a heating part therein is movable upwards and downwards, whereby it is possible to intensively cook food and to prevent the occurrence of eddy currents due to heat generated from the heater when smoke is suctioned.

It is a further object of the present invention to provide a smoke exhaust hood apparatus having a heater for cooking food configured such that a heater assembly is movable upwards and downwards, whereby it is possible to adjust the intensity of heat that is transmitted to a cooking part and to secure the space defined on the cooking table.

Technical Solutions

In accordance with the present invention, the above and other objects can be accomplished by the provision of a smoke exhaust hood apparatus having a heater for cooking food, the smoke exhaust hood apparatus including a suction part for suctioning smoke generated by a cooking part, an exhaust pipe for discharging the smoke suctioned by the suction part to the outside, and a heater assembly provided at one side of the outside of one of the exhaust pipe and the suction part for emitting heat from above the cooking part.

The heater assembly may include a heater including a heating part, a housing disposed so as to wrap the portion of the heater that is opposite the heating part, a connection part having one end extending from one side of the housing and the other end coupled to one side of the outside of one of the exhaust pipe and the suction part via a turning part, and a support for connecting the heater to the inner surface of the housing.

The connection part may be turnably connected to the exhaust pipe and the suction part.

The exhaust pipe may include a plurality of height adjustment holes formed in the exhaust pipe in a recessed shape so as to be arranged at predetermined intervals in the longitudinal direction of the exhaust pipe, and a fixing part configured to be fastened to one of the height adjustment holes via a fastener, one end of the connection part being coupled to the fixing part.

The heater may include a first plate, connected to the support, and a second plate, mounted at the front surface of the first plate so as to be movable upwards and downwards, the second plate having the heating part therein.

Advantageous Effects

The smoke exhaust hood apparatus having the heater for cooking food according to the present invention has the following effects:

1) the heater is mounted in the vicinity of the outside of the smoke exhaust hood apparatus, which is installed above food, in order to uniformly the upper part of the food or the upper and lower parts of the food, whereby it is possible to shorten the cooking time and improve the taste of the food;

2) the turnable heater assembly is provided such that the heater assembly can be turned and fixed in place when cooking is not being performed or when cooking is finished, whereby it is possible to allow a user to use a wide space of a cooking table;

3) the heater is configured to have a dual plate structure, in which the heater is moved downward as needed, whereby it is possible to prevent eddy currents generated by heat from disturbing an exhaust operation and to more efficiently use a heat source at the time of cooking; and 4) the height adjustment means is provided in order to adjust the vertical position of the heater assembly, whereby it is possible to adjust the intensity of heat that is emitted to food and to secure space on the cooking table.

Description of Reference Symbols

Figure 1:
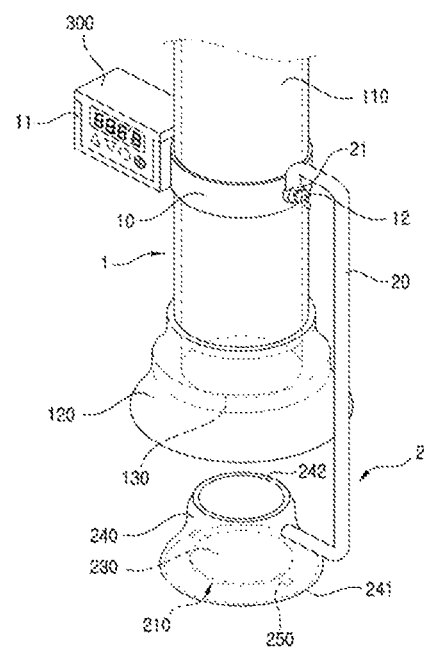
FIG. 1 is a perspective view of a smoke exhaust hood apparatus having a heater for cooking food according to the present invention.

| | |
|---|---|
| 1: Exhaust hood | 2: Heater assembly |
| 10: Fixing part | 11: Controller bracket |
| 12: Turning bolt | 20: Connection part |
| 20a: First connection part | 20b: Second connection part |
| 21: Turning part | 110: Exhaust pipe |
| 111: Height adjustment hole | 112: Fastener |
| 113: Stopper | 120: Suction part |
| 130: Suction hole | 210: Heater |
| 220: Heating part | 230: Plate |
| 231: First plate | 232: Second plate |
| 233: Coupling recess | 234: Plate screw-thread |
| 235: Shaft | 236: Motor |
| 240: Housing | 241: First opening part |

Description of Reference Symbols

| | |
|---|---|
| 242: Second opening part | 250: Support |
| 300: Controller | 310: Sensor module |
| 311: Temperature sensor | 312: Smoke sensor |
| 320: Driving control module | 321: Temperature-setting unit |
| 322: On/off control unit | 323: Upward-and-downward movement control unit |
| 324: Sound output unit | 330: Display unit |

DETAILED DESCRIPTION OF EMBODIMENTS

The present invention provides a smoke exhaust hood apparatus having a heater for cooking food, the smoke exhaust hood apparatus including a suction part for suctioning smoke generated by a cooking part, an exhaust pipe for discharging the smoke suctioned by the suction part to the outside, and a heater assembly provided at one side of the outside of one of the exhaust pipe and the suction part for emitting heat from above the cooking part.

Reference will now be made in detail to the preferred embodiments of the present invention, examples of which are illustrated in the accompanying drawings. The accompanying drawings are not shown to scale. Wherever possible, the same reference numbers will be used throughout the drawings to refer to the same or like parts.

An exemplary smoke exhaust hood apparatus may extend from the ceiling in the shape of a bellows such that the length of the smoke exhaust hood apparatus is adjustable. Alternatively, the smoke exhaust hood apparatus may include an exhaust pipe 110 configured to be bent from a cooking table so as to be rounded and configured to extend to above a cooking zone, in which food is located. The bellows-type hood apparatus may further include an upward-and-downward movement switch for automatically adjusting the height of the hood apparatus. A suction part 120 having a suction hole 130 formed therein is provided at the end of the exhaust pipe 110 so as to have a narrow-topped and wide-bottomed structure such that the suction part 120 is capable of easily suctioning smoke from a wider area. In addition, the end-side inner diameter of the suction part 120, i.e. the suction hole 130, may be provided with an oil collection cap for collecting oil, which is suctioned when oily food is cooked and then drips down. Furthermore, a hood cap for protecting the hood may be further provided.

In terms of the structure of an exhaust hood 1 for suctioning smoke, the present invention may be similar in construction to what has been described above. In addition to this, however, the present invention is characterized in that a smoke exhaust hood apparatus having a heater for cooking food according to the present invention includes a heater assembly 2 connected to one side of the outside of the exhaust hood 1 for supplying heat to a cooking part.

Figure 2:
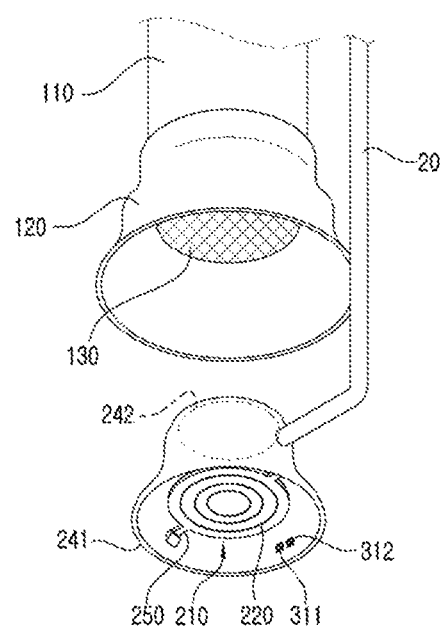
FIG. 2 is a bottom perspective view of the smoke exhaust hood apparatus according to the present invention.

FIG. 1 is a perspective view of a smoke exhaust hood apparatus having a heater for cooking food according to the present invention, and FIG. 2 is a bottom perspective view of the smoke exhaust hood apparatus according to the present invention.

As can be seen from FIGS. 1 and 2, the present invention is characterized in that a heater assembly 2 is connected to one side of the outside of a conventional smoke exhaust hood apparatus.

In the present invention, the heater assembly 2 may include a heater 210 for cooking food, a housing 240 connected to the heater 210 via one or more supports 250 and configured to wrap the heater 210 in order to efficiently concentrate heat and to prevent heat from being emitted to the outside, and a connection part 20 extending from the housing 240 in order to connect the heater assembly 2 to an exhaust hood 1.

The heater 210 may include a heating part 220 for supplying heat, which is the main function of the heater assembly 2. In addition, the heater 210 may include a plate 230 configured to accommodate the heating part 220 on the surface thereof in order to structurally reinforce the heating part 220.

The heating part 220, which is located at the surface of the heater 210 facing the cooking part and provides a heating function to heat food, may be configured to have a structure that emits heat downwards using butane gas or other liquefied fuels. In this structure, however, heat may be discharged upwards due to a convection phenomenon, or fuel may need to be replaced, which may be troublesome. In order to solve these problems, the heating part 220 may be constituted by a heating wire configured to have an infrared emission structure or a coil structure, or may be constituted by a halogen lamp, which exhibits high heating efficiency.

In the case in which the heating part 220 is constituted by a heating wire configured to generate infrared rays or electric heat, the heating part 220 may be configured to have any of various kinds of structures, such as a spiral structure, a concentric structure, a lattice structure, or a curved structure having a plurality of bent portions. As the area of the heating wire is increased, heating power may also be increased. In this case, however, a suction hole 130, which is located at the upper side of the heater 210, may be blocked by the heating wire. For this reason, the length and pattern of the heating part 220 may be freely extended within a range within which it is guaranteed to smoothly suction smoke through the suction hole 130.

The heating part 220 may be utilized to cook the upper part of food by transferring heat from top to bottom, unlike a conventional hot plate for public restaurants or a conventional cooking device, in which heat is transferred only from bottom to top in order to cook food. Furthermore, in the case in which the heating part 220 is used as an auxiliary heating means at the time of using a conventional cooking device, which transfers heat from bottom to top, it is possible to simultaneously transfer heat to food both from the top and from the bottom in order to cook the food. Consequently, it is possible to shorten a cooking time and to uniformly cook delicious food, whereby convenience of cooking may be improved.

Although not shown in the drawings, when the heating part 220 is operated in an electric heating mode, one of the supports 250 may serve as a path, through which an electric wire, for supplying electric power to the heating part 220 and for receiving an on/off signal and a high/low control signal from a controller 300, extends.

In addition, although also not shown in the drawings, a battery may be provided at the outer surface of the housing 240 in order to supply electric power to the heating part 220. Alternatively, the electric wire connected to the heating part 220 may be extended in order to directly supply alternating-current electric power to the heating part 220.

Although the heater 210 may include only the heating part 220, as described above, the heater 210 may further include a plate 230 for accommodating the heating part 220 in order to improve the stability and efficiency of the heating part 220. The plate 230 is connected and fixed to the housing 240 via the one or more supports 250 such that the plate 230 faces downwards toward the cooking part. In addition, an insulation layer may be stacked on the rear surface of the plate 230, which is opposite the surface of the plate 230 on which the heating part 220 is accommodated, in order to prevent heat from being emitted in the reverse direction, whereby it is possible to improve thermal efficiency.

Figure 6:
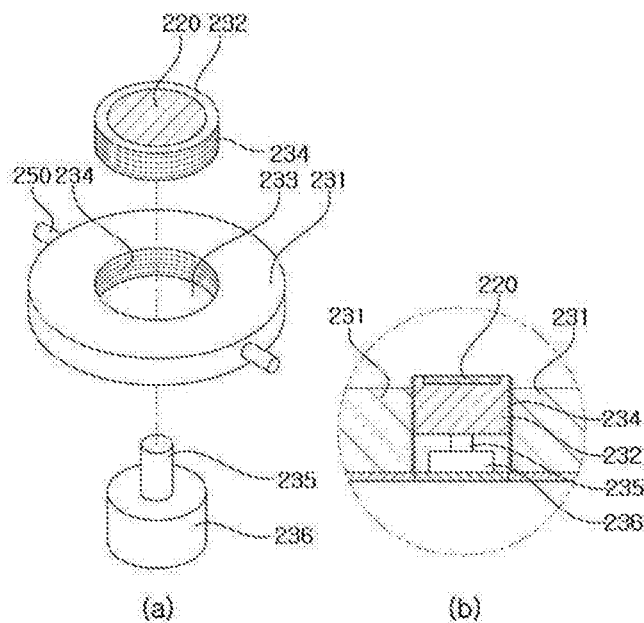
FIG. 6 is a conceptual view showing a modified structure of a plate constituting the heater of the present invention.

As will be described below, the plate 230 may be configured to have a modified structure, as shown in FIG. 6, in order to provide an additional function of adjusting the distance between the heating part 220 and the cooking part at the time of cooking.

The housing 240, which is connected to one side of the heater 210 via the supports 250, includes a first opening part 241, through which heat is emitted downwards toward the cooking part. In addition, the housing 240 may further include a second opening part 242 provided at the upper end thereof, which communicates with a suction part 120, for allowing smoke generated at the time of cooking and a small amount of residual heat to be discharged therethrough.

The relationship between the diameters of the respective opening parts directly and indirectly affects the flow of heat and smoke. In the case in which the housing 240 is configured to have a vertical cylindrical structure, in which the first opening part 241 and the second opening part 242 have the same diameter, heat reflected in the housing 240 is discharged out of the housing 240 both through the first opening part 241 and through the second opening part 242 in the state in which the heat has no directivity. In the case in which the diameter of the first opening part 241 is greater than the diameter of the second opening part 242, on the other hand, even the portion of the heat emitted from the heating part 220 that does not move downwards may be reflected in the housing 240 and may then be discharged out of the housing 240 through the first opening part 241. For this reason, it is preferable to form the housing 240 such that the diameter of the first opening part 241 is greater than the diameter of the second opening part 242.

In the case in which the housing 240 is formed so as to have the above structure, the housing 240 may be generally formed in the shape of a hat or a dome. Furthermore, in the case in which the housing 24 is formed in the shape of a curved conical hat having a normal distribution curve in section, it is possible to extend the area across which heat is discharged downwards and to collect smoke from a wider area, including toxic gas that may be generated at the time of cooking food, through the first opening part 241 of the housing 240, whereby it is possible to improve a smoke-discharging function. Consequently, it is preferable to form the housing 240 such that the housing 240 has any of various kinds of structures, such as a simple conical hat structure, a dome structure, or a curved conical hat structure having a normal distribution curve in section.

In addition, considering that smoke is discharged out of the housing 240 through the second opening part 242, it may not be possible for the suction hole 130 to suction all of the smoke in the case in which the diameter of the second opening part 242 is greater than the diameter of the suction hole 130. Consequently, it is preferable to form the housing 240 such that the diameter of the second opening part 242 is equal to or similar to the diameter of the suction hole 130.

In addition, a reflective sheet having a metal or a chemical material coated or stacked thereon may be provided at the inside of the housing 240 in order to improve the reflectance of heat. The reflectance of heat is greatly dependent on the state of the surface of the sheet. From this aspect, a metal such as zinc or aluminum is used as a material constituting the sheet, since zinc or aluminum exhibits high reflectance of heat. Preferably, the sheet is made of aluminum, which exhibits high corrosion resistance and high heat resistance, in order to improve the chemical stability of a cooking device.

In addition, an insulation layer may be stacked on the outer surface of the housing 240 in order to prevent heat from being discharged out of the housing 240, whereby it is possible to prevent undesired heat from being transferred to a user.

The connection part 20, which connects the heater assembly 2 to one side of the outside of any one of an exhaust pipe 110 and the suction part 120, may be formed at one side of the housing 240. The connection part 20 may be formed in the shape of a simple curve, or may be bent in two steps or three steps, as shown in FIG. 1. When the end of the connection part 20 is connected to a portion that is near the suction part 120, the connection part 20 may be configured to have a compact hinge structure, which is different depending on the point to which the connection part 20 is connected.

In the case in which the connection part 20 is configured to have a one-step bent structure, the portion of the connection part 20 that extends from the housing 240 is bent once, and then reaches the side wall of the exhaust pipe 110. This structure is advantageous in that the structure is simple and thus is easy to install. In the case in which the connection part 20 is configured to have a two-step bent structure, on the other hand, the portion of the connection part 20 that extends from the housing 240 in the horizontal direction is bent toward the ceiling, is then bent toward the exhaust pipe 110, and is finally connected to the side wall of the exhaust pipe 110. In this structure, the load of external force may be distributed to the respective bent portions of the connection part 20. In the case in which the connection part 20 is configured to have a two-step bent structure, therefore, the connection part 20 exhibits higher stability than in the case in which the connection part 20 is configured to have a two-step bent structure. Consequently, it is preferable to configure the connection part 20 so as to have a one-step bent structure in the case in which the connection part is connected closely to the suction part 120, and it is preferable to configure the connection part 20 so as to have a two-step bent structure in the case in which stability of the connection part is required. In the accompanying drawings, the portion of the connection part 20 that is adjacent to the exhaust pipe is bent once in order to show a hinge structure including a fixing bolt 12. However, this modification of course does not greatly affect the above description.

Although not shown in the drawings, the structure of the connection part 20 may be simplified such that the heater assembly 2 can be folded to the side surface of the suction part 120. In other words, the connection part 20 is configured only to have a hinge structure, in which the connection part is turned in the same manner as when a notebook is opened and closed, unlike the above-described embodiment, in which the connection part 20 extends in the shape of a line or in the shape of a bar. In the case in which the heater assembly 2 is configured to have the above structure, the heater assembly 2 is folded and fixed to the side surface of the suction part 120 when not in use, and the heater assembly 2 is pulled down in the same manner as when a notebook is opened in order to use the heater assembly 2 at the time of cooking such that the heater 210 faces food in order to cook the food. In this way, the connection part may be configured to have any of various physical turning structures.

The controller 300 and the connection part 20 may be fixed to a fixing part 10, which may be selectively provided at the exhaust pipe 110 of the exhaust hood 1. Various fixing means are well known. In the specification, however, a fixing means that is capable of simultaneously fixing the fixing part 10 and turning the connection part 20 is presented as an embodiment of the present invention.

The fixing part 10 may be formed in a single structural body, more specifically, may be formed in the shape of an alphabet letter e, having fixing holes formed through opposite ends thereof. The fixing part 10 may be disposed along the circumference of the exhaust pipe 110 so as to wrap the exhaust pipe 110, and may be fixed to the exhaust pipe 110 using the fixing bolt 12, which is inserted through the fixing part 10. Described in detail, the fixing part 10 is formed so as to be slightly longer than the circumferential length of the exhaust pipe 110 such that the fixing part 10 can wrap the exhaust pipe 110. As a result, opposite ends of the fixing part 10 may overlap each other at predetermined portions thereof. The fixing holes formed in the opposite ends of the fixing part 10 overlap each other so as to be aligned with each other, and the fixing bolt 12 is inserted through the overlapping fixing holes, whereby the fixing part 10 is fixed in the state of being in tight contact with the exhaust pipe 110. At this time, the portion of the connection part 20 that is adjacent to the heater assembly 2 may serve as a hinge such that the heater assembly 2 can be turned, which will be described in detail with reference to FIG. 4 by way of example.

In the above-described embodiment of the fixing part 10, the fixing bolt 12 is configured to be frequently fastened and unfastened in order to turn the connection part 20. For this reason, a wing bolt or a knob bolt, which is configured for a user to be able to directly fasten and unfasten without using a specific tool, may be used as the fixing bolt 12.

A controller bracket 11 connects the controller 300, which provides a function of setting the temperature of the heating part 220 and a power on/off control function, to the exhaust pipe 110. The controller bracket 11 may be located at the side surface of the exhaust hood 1 or one side of the cooking table. In the above-described embodiment, the controller bracket 11 may be provided at one side of the fixing part 10. The controller 300, which sets the temperature of the heating part 220, performs power on/off control, and controls the upward-and-downward movement of the plate 230, is accommodated in the controller bracket 11. The controller bracket 11 is provided at one side of the fixing part 10.

Figure 3:
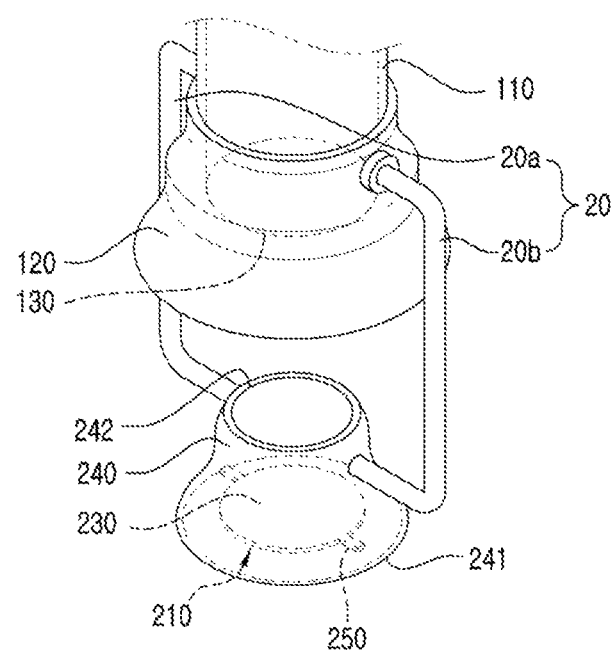
FIG. 3 is a perspective view showing a structure in which a connection part of the present invention includes two parts.

FIG. 3 is a perspective view showing a structure in which the connection part of the present invention includes two parts.

The connection part 20 may be connected to the exhaust pipe in the shape of a single body, as shown in FIGS. 1 and 2. Alternatively, the connection part may include two or more parts in order to more securely achieve the supporting and turning functions. In this structure, the connection part 20 may include a first connection part 20a and a second connection part 20b, as can be seen from FIG. 3. The first connection part 20a may be connected to one side of the outside of one of the exhaust pipe 110 and the suction part 120, which is referred to as a first side portion. The second connection part 20b may be connected to one side of the outside of one of the exhaust pipe 110 and the suction part 120. Preferably, the second connection part 20b is connected to a portion of the outside of one of the exhaust pipe 110 and the suction part 120 that is different from the first side portion. More preferably, the first connection part 20a and the second connection part 20b are provided so as to be symmetrical with respect to the longitudinal axis of the exhaust hood 1. This structure is advantageous when turning the heater assembly 2, a description of which will follow.

Figure 4:
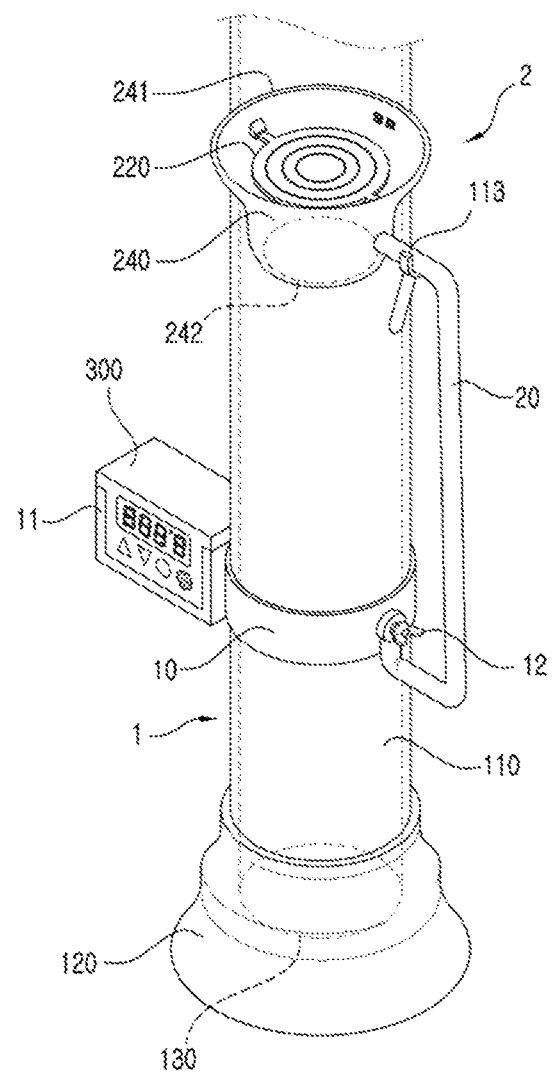
FIG. 4 is a use state view showing the state in which a heater assembly of the present invention is turned.

FIG. 4 is a use state view showing the state in which the heater assembly of the present invention is turned.

The connection part 20 may be connected to the fixing part 10, which wraps the exhaust pipe 110 in the shape of a cylinder, via a turning part 21, which is provided at the end of the connection part 20 that is opposite the housing 240. The fixing bolt, which is inserted through the overlapping portions of the fixing part 10, is also inserted through the turning part 21. Consequently, it is possible to turn the entirety of the heater assembly 2, including the connection part 20.

That is, when the fixing bolt 12 is inserted through the two fixing holes, the turning part 21 (i.e. the ring-shaped end) of the connection part 20 is located between the head of the fixing bolt 12 and the fixing holes. In this structure, the turning part 21 can freely move in the state in which the fixing bolt 12 is unfastened, whereby it is possible to turn the heater assembly 2 upwards and downwards. When the fixing bolt 12 is fastened after the heater assembly 2 is turned to the position at which the heater assembly is to be fixed, therefore, the connection part 20 and the heater assembly 2 are fixed to each other.

Additionally, in the case in which an elastic member having formed therein a screw thread, having the same diameter as each of the two fixing holes, is provided between the fixing holes, the force of friction between the elastic member and the fixing bolt 12 may be increased as the fixing bolt 12 is fastened, whereby it is possible to increase the fixing force of the fixing bolt 12.

The above-described turning structure is one of the embodiments of the technical idea of the present invention, and therefore any other turning structures may also be provided, as long as the turning structures do not depart from the idea of the present invention. For example, in the case in which a disc-shaped turning part 21 is mounted at the end of the connection part 20 that is opposite the housing 240 and in which a receiving part, formed in the shape of a recess so as to correspond to the disc-shaped turning part 21 in order to securely receive the turning part 21, is provided at one side of the exhaust pipe 110 or the suction part 120, to which the connection part 20 is connected, the connection part 20 may be smoothly turned without being separated from the exhaust pipe 110 or the suction part 120.

In addition, a stopper 113 may be provided at one side of the exhaust pipe 110 in order to fix the heater assembly 2 when the heater assembly 2 is not in use. The stopper 113 protrudes from one side of the exhaust pipe 110 in order to hold the heater assembly 2 after the heater assembly 2 is turned. More specifically, when the heater assembly 2 is turned and brought maximally close to the exhaust pipe 110, the heater assembly 2 may be fixed to the exhaust pipe 110 via the stopper 113, whereby it is possible to safely dispose the heater assembly 2 after the heater assembly 2 is used. It is not necessary to specify whether the portion of the heater assembly 2 that is fixed to the stopper 113 is the housing 240 or the connection part 20. Appropriately, however, the portion of the heater assembly 2 that is fixed to the stopper 113 is the connection part 20, which may be formed in the shape of a line or a bar, which is relatively simple. The stopper 113 may be configured to have any of various structures, such as a simple branch structure, a Y-shaped branch structure, or a hook-shaped structure.

In the case in which the connection part 20 is configured to include two or more parts, as described above, stoppers 113 may be provided in a number corresponding to the number of parts constituting the connection part 20.

Although not shown in the drawings, as another structure of the connection part 20, the connection part 20 may be formed in the shape of a bellows, which is frequently connected to a faucet in a kitchen or a bathroom, such that a user can directly adjust the position of the heater assembly 2. In this structure, the heater assembly 2 may be held by the stopper 113 when not in use, and may be manually moved so as to be located at the upper end of the cooking part at the time of cooking. In addition, a hook-shaped handle may be formed at the upper end of the housing 240 for smooth operation. In this case, the second opening part 242, which may be formed at the upper end of the housing 240 such that heat and smoke are discharged out of the housing 240 through the second opening part 242, may be provided at the upper peripheral portion of the housing 240 so as to be adjacent to the suction hole 130 such that the second opening part 242 is spaced apart from the handle, at which a hand of the user is located. In this embodiment, the stopper 113 may be configured to have a hook-shaped concave and convex structure for allowing the handle to be held thereon. In addition, an additional identical stopper 113 may also be provided at the center of the suction part 120, which is located at the lower end of the exhaust pipe 110, such that the heater assembly 2 can be used as a heat source at the time of cooking in the state of being held by the additional stopper 113 even in the case in which the user does not directly hold the heater assembly 2.

Figure 5:
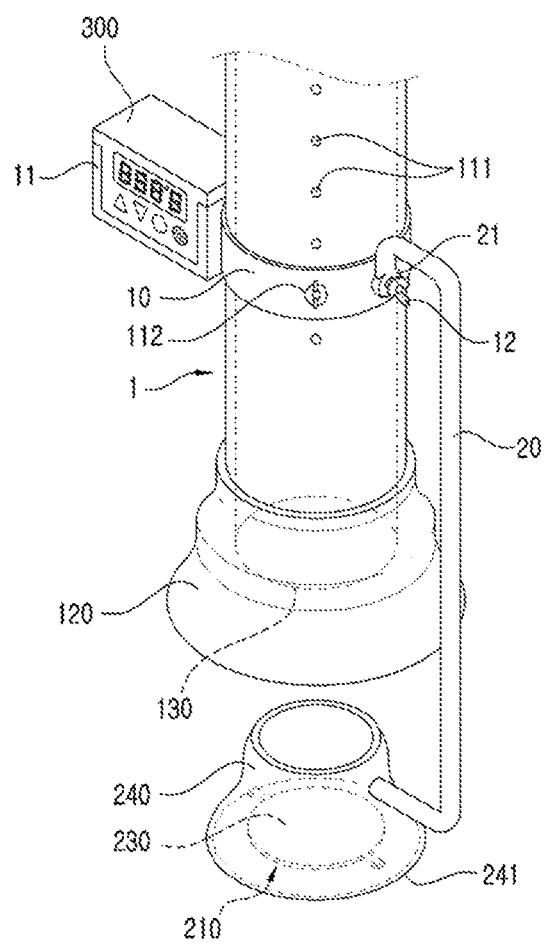
FIG. 5 is a perspective view showing the structure of height adjustment holes provided in the smoke exhaust hood apparatus according to the present invention.

FIG. 5 is a perspective view showing the structure of height adjustment holes provided at the smoke exhaust hood apparatus according to the present invention.

As shown in FIG. 5, height adjustment holes 111, arranged at predetermined intervals, may be provided in order to adjust the height of the fixing part 10, to which the heater assembly 2 is connected and to which the controller bracket 11 is fixed. The height adjustment holes 111 are formed in one side of the exhaust pipe 110 in the shape of a recess so as to be arranged at predetermined intervals in the longitudinal direction of the exhaust pipe 110. The fixing part 10 is coupled to the exhaust pipe 110 by inserting a fastener 112 into one of the height adjustment holes 111, whereby the height of the fixing part 10 is adjusted. The fastener 112 may be formed in any of various shapes. In the case in which a screw thread is formed in each of the height adjustment holes 111, a bolt may be used as the fastener 112. For user convenience, the bolt may be a wing bolt or a knob bolt. In addition, in the case in which a bolt is used to adjust the height of the fixing part 10, the fixing bolt 12, which fixes the fixing holes and the hinge, may adjust the height of the fixing part 10.

If the height adjustment holes 111 are formed as through-holes, smoke that moves upwards along the exhaust pipe 110 may leak out of the exhaust pipe 110 through the height adjustment holes 111. In the case in which the height adjustment holes 111 are formed as through-holes, therefore, each of the height adjustment holes 111 may be closed by a cap having a diameter corresponding to the diameter of each height adjustment hole 111. The cap may be made of a plastic material that exhibits high thermal conductivity or a metal material, since the cap must be prevented from being twisted or deformed by residual heat rising upwards from the heater 210.

In addition, although not shown in the drawings, various other height adjustment means may be provided at the exhaust pipe 110. For example, a guide rail, a belt-and-pulley structure, or a rack-and-pinion structure may be provided.

Among the above-specified structures, the guide rail may have therein a space for accommodating a cable. Consequently, it is possible to safely arrange power cables of the controller 300 and the heater 210 using the space in the guide rail.

FIG. 6 is a conceptual view showing a modified structure of the plate, which constitutes the heater of the present invention.

In the embodiment shown in FIG. 6, the plate 230, which constitutes the heater 210, is configured to have a multi-layered structure including first and second plates 230. In particular, this embodiment is characterized in that the second plate 232, which has the "heating part 220" therein, can move upwards and downwards relative to the first plate 231.

Specifically, the plate 230 includes a first plate 231, which may serve as a base, which may be connected to the supports 250, and which may be configured such that a heat dissipation plate can be mounted in the vicinity of a coupling portion between the rear surface thereof and a second plate 232, and the second plate 232, which is mounted on the front surface of the first plate 231 (i.e. the surface of the first plate 231 that faces food) and which has the "heating part 220" therein.

As can be seen from FIG. 6, the second plate 232 is mounted in a coupling recess 233, which is formed in an approximate center of the front surface of the first plate 231, and the first and second plates 230 are coupled to each other through screw engagement between plate screw threads 234, which are formed in the inner circumferential surface of the coupling recess 233 and in the outer circumferential surface of the second plate 232.

Furthermore, a shaft 235 is connected to the central region of the rear surface of the second plate 232, and the shaft 235 is controlled to be rotated by a motor 236 (preferably a step motor) formed at one side of the first plate 231 or around the first plate 231.

In the above structure, the shaft 235 may be rotated in the forward direction or the reverse direction according to the driving of the motor 236 such that the second plate 232 can be advanced forwards or can be retreated rearwards along the plate screw thread 234 thereof. This operation may be expressed as the second plate 232 moving upwards and downwards relative to the first plate 231.

The reason that the second plate 232 is configured so as to move upwards and downwards relative to the first plate 231 is that the second plate 232 can more closely approach food when the food is cooked, whereby convenience in cooking the food is improved, and that the heater 210 is prevented from being located in the same line as the suction hole 130, whereby smoke can be smoothly suctioned through the suction hole 130 due to heating of the heating part 220.

In the case in which the heater 210 and the suction hole 130 are located adjacent to each other, convection currents or eddy currents are generated around the suction hole 130 due to heating of the heating part 220, whereby smoke may not be smoothly suctioned through the suction hole 130. For this reason, the heating part 220 is moved (downwards) to a lower position in order to minimize an adverse effect due to heating of the heating part 220 when smoke is suctioned through the suction hole 130.

The upward-and-downward movement structure of the second plate 232 is merely an illustration for easy understanding. Of course, therefore, the second plate may be configured so as to have various other structures and systems.

The present invention provides characteristics that enable the cooking function of the heater 210 to be promoted and enable the smoke-suctioning function to be independently and smoothly performed based on the construction and function shown in FIG. 6.

Figure 7:
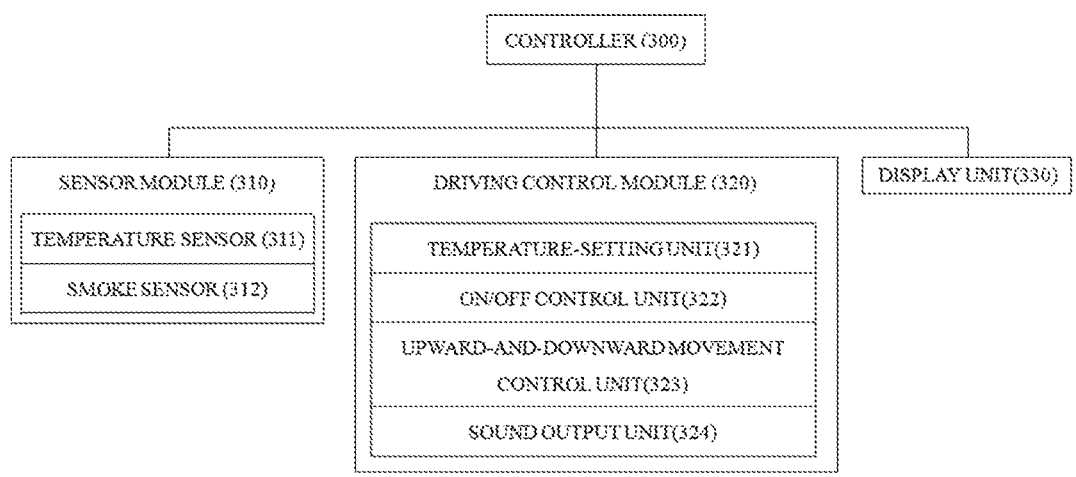
FIG. 7 is a block diagram showing the construction of a controller of the present invention.

FIG. 7 is a block diagram showing the construction of the controller of the present invention.

The smoke exhaust hood apparatus according to the present invention also performs a cooking function. To this end, the smoke exhaust hood apparatus may further include a controller 300 that is capable of providing safety-related functions, such as a temperature control function and a heat-blocking function, based on a specialized sensing function of a sensor module 310, in addition to a function of automatically moving the second plate 232 upwards and downwards, which has already been described above. The controller 300 may be mounted in a physical space or region separated from the heater 210. For example, the controller 300 may be provided at one side of the smoke exhaust hood apparatus, as shown in FIG. 1, or may be mounted at one side of the cooking table. In addition, the controller 300 may be driven in a wireless fashion.

Specifically, the controller 300 mainly includes a sensor module 310 for sensing the surroundings, a display unit for displaying the sensed information, and a driving control module 320 for automatically or manually control the movement of the smoke exhaust hood apparatus according to the information.

The sensor module 310 includes a temperature sensor 311 and a smoke sensor 312. The temperature sensor 311 may be located at a predetermined region of the inside of the housing 240, which wraps the heater 310. Preferably, the temperature sensor 311 is spaced apart from the heater 210 by a predetermined distance. It is appropriate for temperature information, which is necessary when a user manipulates the heater 210, to be the temperature of the heat that is applied to the food, rather than the temperature of the heater 210 itself. Consequently, a temperature value sensed by the temperature sensor 311 may be converted into an appropriate level through pre-learned calculation, and may then be displayed to a user through the display unit 330. The user may confirm the displayed temperature, and may manipulate a temperature-setting unit 321, which is included in the driving control module 320, in order to set the temperature of the heater 210.

An automatic feedback process may be configured as follows. The temperature sensor 311 may sense the set temperature again, and may transmit the sensed temperature to an on/off control unit of the driving control module 320. In the case in which the temperature exceeds the set temperature, the second plate 232 may be moved downwards relative to the first plate 231, or the heater 210 may be turned off for a predetermined amount of time. In the case in which the temperature becomes lower than the set temperature again, the second plate 232 may be moved upwards relative to the first plate 231, or the heater 210 may be turned on. In addition to this, a temperature range that is too high to cook food may be set as the upper-limit temperature of the heater 210. In the case in which the temperature exceeds the upper-limit temperature, a safety measure may be provided to determine that the heater 210 malfunctions and to interrupt the supply of electric power.

In addition, the smoke sensor 312 of the sensor module 310 may be located at the same region inside the housing 240 or inside the suction hole 130, where smoke is finally received, in the same manner as the temperature sensor 311. The smoke sensor 312 senses the amount or composition of toxic gas and smoke that may be generated during a cooking process, such as roasting of meat, and transmits the sensing result to the driving control module 320.

In the case in which the amount of smoke is greater than a reference value, the driving control module 320 may perform control such that the second plate 232 is moved upwards in order to secure space around the suction hole 130 and thus to restrain the occurrence of eddy currents. In addition, a cooking guide mechanism may be provided to turn off the heater 210 or to lower the set temperature upon determining that food is too burnt with reference to smoke-cooking state data, which are input in advance.

The smoke-cooking state data are data about the state of food based on the concentration and composition of smoke. Data may be provided for respective items of food that require the smoke exhaust hood apparatus ranging from meat, which is the most frequently cooked, to broiled food such that the data can be selectively applied to a cooking guide process.

The temperature-setting unit 321, the on/off control unit 322, and an upward-and-downward movement control unit 323 may be located at one side of the table, and may be operated in a wireless fashion. Alternatively, as shown in FIG. 1, the above units may be mounted in a control box, which includes the display unit 330. In addition, the driving control module 320 of the controller 300 may be further provided with a sound output unit 324 for outputting a guidance message in the form of a prerecorded voice, for example "Food is burning" or "Meat has been cooked."

The smoke exhaust hood apparatus having the heater for cooking food according to the present invention has been disclosed through the above description and the drawings, which, however, have been provided merely by way of example. The idea of the present invention is not limited by the above description and the drawings, and various alterations and modifications are possible without departing from the technical idea of the present invention.

INDUSTRIAL APPLICABILITY

According to the present invention, it is possible to produce the heater and the hood apparatus in great quantities, and therefore the present invention has industrial applicability.

The invention claimed is:

1. A smoke exhaust hood apparatus having a heater for cooking food, the smoke exhaust hood apparatus comprising:
a suction part for suctioning smoke generated by a cooking part;
an exhaust pipe for discharging the smoke suctioned by the suction part to an outside; and
a heater assembly provided at one side of an outside of one of the exhaust pipe and the suction part for emitting heat from above the cooking part, wherein
the heater assembly comprises:
a heater comprising a heating part;
a housing disposed so as to wrap a portion of the heater that is opposite the heating part;
a connection part having one end extending from one side of the housing and the other end turnably coupled to one of the exhaust pipe and the suction part via a turning part;
a stopper mounted to one side of the exhaust pipe for fixing the housing after the housing is turned to the exhaust pipe by the turning part; and
a support for connecting the heater to an inner surface of the housing.

2. The smoke exhaust hood apparatus according to claim 1, wherein the connection part comprises:
a first connection part connected to a first side portion of one of the exhaust pipe and the suction part; and
a second connection part connected to a second side portion of the one of the exhaust pipe and the suction part, which is different from the first side portion.

3. The smoke exhaust hood apparatus according to claim 1, wherein the housing comprises:
a first opening part, which is open toward the cooking part; and
a second opening part, which is opposite the first opening part.

4. The smoke exhaust hood apparatus according to claim 1, wherein the smoke exhaust hood apparatus further comprises:
a sensor module comprising a temperature sensor for sensing temperature; and
a controller comprising an on/off control unit for performing on/off control of the heater by comparing information about the temperature received from the temperature sensor with a reference temperature.

5. The smoke exhaust hood apparatus according to claim 1, wherein the exhaust pipe comprises:
a plurality of height adjustment holes formed in the exhaust pipe in a recessed shape so as to be arranged at predetermined intervals in a longitudinal direction of the exhaust pipe; and
a fixing part configured to be fastened to one of the height adjustment holes via a fastener, one end of the connection part being coupled to the fixing part.

6. The smoke exhaust hood apparatus according to claim 1, wherein the heater comprises:
a first plate connected to the support; and
a second plate mounted at a front surface of the first plate so as to be movable upwards and downwards, the second plate having the heating part therein.

7. The smoke exhaust hood apparatus according to claim 4, wherein
the sensor module further comprises a smoke sensor for sensing presence and absence of smoke and an amount of smoke, and
the controller further comprises an upward-and-downward movement control unit for differentially controlling upward-and-downward movement of the second plate by comparing the information about the temperature received from the temperature sensor and information about the smoke received from the smoke sensor with the reference temperature and reference smoke information, respectively.

* * * * *